(12) United States Patent
Scholl et al.

(10) Patent No.: US 7,715,309 B2
(45) Date of Patent: May 11, 2010

(54) METHOD AND APPARATUS FOR RELIABLE COMMUNICATIONS IN A PACKET NETWORK

(75) Inventors: Thomas Scholl, New Haven, CT (US); Jennifer Joy, Austin, TX (US); Markus Weber, Pflugerville, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 872 days.

(21) Appl. No.: 11/420,200

(22) Filed: May 24, 2006

(65) Prior Publication Data

US 2007/0274229 A1 Nov. 29, 2007

(51) Int. Cl.
*G01R 31/08* (2006.01)
*G06F 11/00* (2006.01)
*G08C 15/00* (2006.01)

(52) U.S. Cl. .................................................. 370/218

(58) Field of Classification Search ................ 370/351, 370/352, 353, 354, 355, 356, 360, 395.32
See application file for complete search history.

(56) References Cited

U.S. PATENT DOCUMENTS

| | | | | |
|---|---|---|---|---|
| 6,307,834 | B1 * | 10/2001 | Worster | 370/218 |
| 6,697,329 | B1 * | 2/2004 | McAllister et al. | 370/235 |
| 6,751,746 | B1 * | 6/2004 | Jain et al. | 714/4 |
| 6,778,492 | B2 | 8/2004 | Charny et al. | |
| 6,915,436 | B1 | 7/2005 | Booth, III et al. | |
| 6,996,065 | B2 | 2/2006 | Kodialam et al. | |
| 7,023,848 | B2 * | 4/2006 | Yehuda et al. | 370/390 |
| 2001/0005358 | A1 * | 6/2001 | Shiozawa | 370/228 |
| 2002/0112072 | A1 * | 8/2002 | Jain | 709/239 |
| 2003/0231614 | A1 * | 12/2003 | Beyda et al. | 370/351 |
| 2004/0034702 | A1 * | 2/2004 | He | 709/224 |
| 2004/0037219 | A1 | 2/2004 | Shaffer et al. | |

(Continued)

FOREIGN PATENT DOCUMENTS

JP 2003298632 10/2003

OTHER PUBLICATIONS

Kodialam et al., "Dyanmic Routing of Bandwidth Guaranteed Tunnels with Restoration", INFOCOM 2000, 19th Annual Joint Conference of the IEEE Computer and Communications Societies, Proceedings. IEEE Tel Aviv, Israel Mar. 26-30, 2000. Piscataway, NJ, USA, IEEE, US, vol. 2, Mar. 26, 2000. pp. 902-911 (XP010376180).

*Primary Examiner*—Gregory B Sefcheck
*Assistant Examiner*—Ashley L Shivers
(74) *Attorney, Agent, or Firm*—Ed Guntin; Akerman Senterfitt

(57) ABSTRACT

A system and method are disclosed for reliable communications in a packet network. A system that incorporates teachings of the present disclosure may include, for example, a network management system (NMS) having a controller programmed to establish between first and second customer edge (CE) routers in a full mesh packet network first and second logical data tunnels conforming to an isolation protocol, synchronize packet data in the first and second logical data tunnels, enable packet data exchanges between the first and second CE routers over the first logical data tunnel, direct the first and second CE routers to duplicate the packet data exchanged between them over the second logical data tunnel, and direct the first and second CE routers to synchronously switch to the second logical data tunnel upon detecting a fault in the first logical data tunnel.

17 Claims, 3 Drawing Sheets

U.S. PATENT DOCUMENTS

2004/0133619 A1* 7/2004 Zelig et al. .................. 709/200
2004/0199662 A1 10/2004 Karol et al.
2005/0013242 A1* 1/2005 Chen et al. .................. 370/228
2006/0215548 A1* 9/2006 Le Faucheur et al. ....... 370/228
2007/0076605 A1* 4/2007 Cidon et al. ................. 370/230
2007/0183317 A1* 8/2007 Vasseur et al. .............. 370/225

* cited by examiner

100

METHOD AND APPARATUS FOR RELIABLE COMMUNICATIONS IN A PACKET NETWORK

FIELD OF THE DISCLOSURE

The present disclosure relates generally to packet networks, and more specifically to a method and apparatus for reliable communications in a packet network.

BACKGROUND

Consumers such as law enforcement agencies, banks, financial institutions and so on in some applications require reliable communications with preferably no interruptions or minimal loss of data transport. Much of the communications infrastructure used by these consumers is based on an Internet architecture which generally does not support the aforementioned reliability demands.

A need therefore arises for a method and apparatus for reliable communications in a packet network.

DETAILED DESCRIPTION

Embodiments in accordance with the present disclosure provide a method and apparatus for reliable communications in a packet network.

In a first embodiment of the present disclosure, a network management system (NMS) can have a controller that manages a communications interface. The controller can be programmed to establish between first and second customer edge (CE) routers in a full mesh packet network a first logical data tunnel conforming to an isolation protocol, establish between the first and second CE routers a second logical data tunnel conforming to the isolation protocol, synchronize packet data in the first and second logical data tunnels, enable packet data exchanges between the first and second CE routers over the first logical data tunnel as a primary transport, direct the first and second CE routers to duplicate the packet data exchanged between them over the second logical data tunnel, and direct the first and second CE routers to synchronously switch to the second logical data tunnel as the primary transport of packet data upon detecting a fault in the first logical data tunnel.

In a second embodiment of the present disclosure, a computer-readable storage medium in a network management system (NMS) can have computer instructions for establishing between first and second routers of a packet network first and second logical data tunnels conforming to an isolation protocol, enabling packet data exchanges between the first and second routers over the first logical data tunnel, and directing the first and second routers to duplicate the packet data exchanged between them over the second logical data tunnel when said first and second routers switch from the first logical data tunnel to the second logical data tunnel as a primary transport of packet data.

In a third embodiment of the present disclosure, a computer-readable storage medium in a first routing element, can have computer instructions for initiating packet data exchanges with a second routing element over a first logical data tunnel as a primary means for exchanging information, and duplicating the packet data exchanged with the second routing element over a second logical data tunnel when said first and second routers switch from the first logical data tunnel to the second logical data tunnel as a primary transport of packet data upon detecting a fault in the first logical data tunnel.

Figure 1:
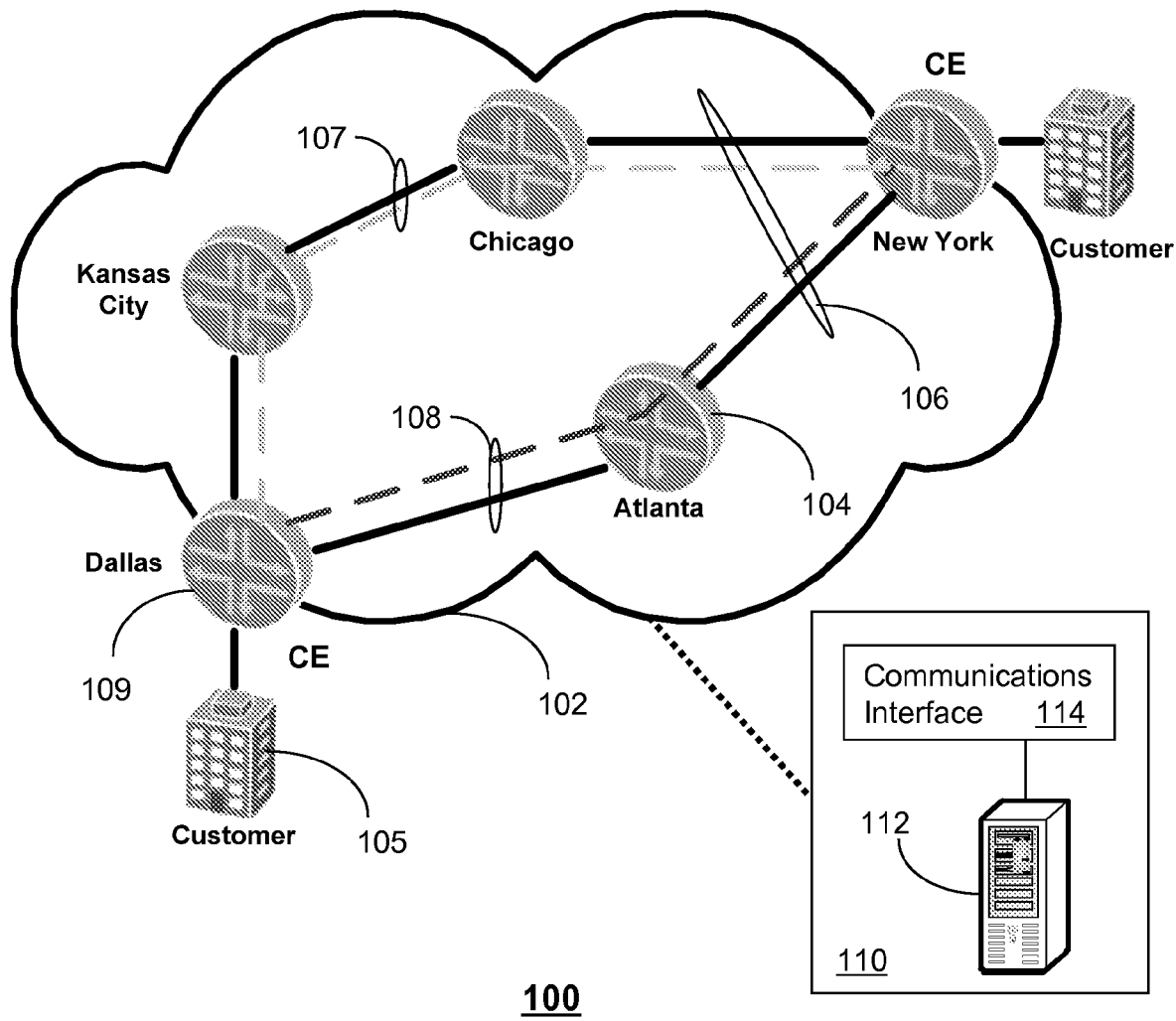
FIG. 1 depicts an exemplary block diagram of a communication system.

FIG. 1 is a block diagram of a communication system 100. The communication system 100 can comprise a packet network 102 having a number of routers 104 for establishing a number of logical data tunnels 106 between one or more customer edge (CE) routers 109. The packet network 102 can comprise, for example, a full mesh multi-protocol label switching (MPLS) network (for illustration purposes only, the packet network 102 will be referred to herein as the MPLS network 102). A logical data tunnel can comprise a GRE (Generic Routing Encapsulation) tunnel, an MPLS tunnel, a layer 2 tunneling protocol (L2TP), an IP in IP tunnel, an IP/VPN tunnel, or combinations thereof. Other packet-based data tunnels not described herein can be utilized by the present disclosure. The CE routers 109 can connect to customer premise equipment (CPE) 105 which can be managed by the end user or service provider of the MPLS network 102.

For illustration purposes only, the logical data tunnels will be referred to herein as GRE tunnels. It would be apparent to an artisan with ordinary skill in the art that alternate tunneling methods may be used in the present disclosure.

The foregoing network elements can be managed by a network management system (NMS) 110. The NMS 110 can comprise a common controller 112 such as a desktop computer or scalable server that communicates with network elements of the MPLS network 102 by way of a communications interface 114 supporting common communication protocols such as TCP/IP. Accordingly, the NMS 110 can direct operations of the intermediate routers 104, and CE routers 109 of the MPLS network 102.

Figure 2:
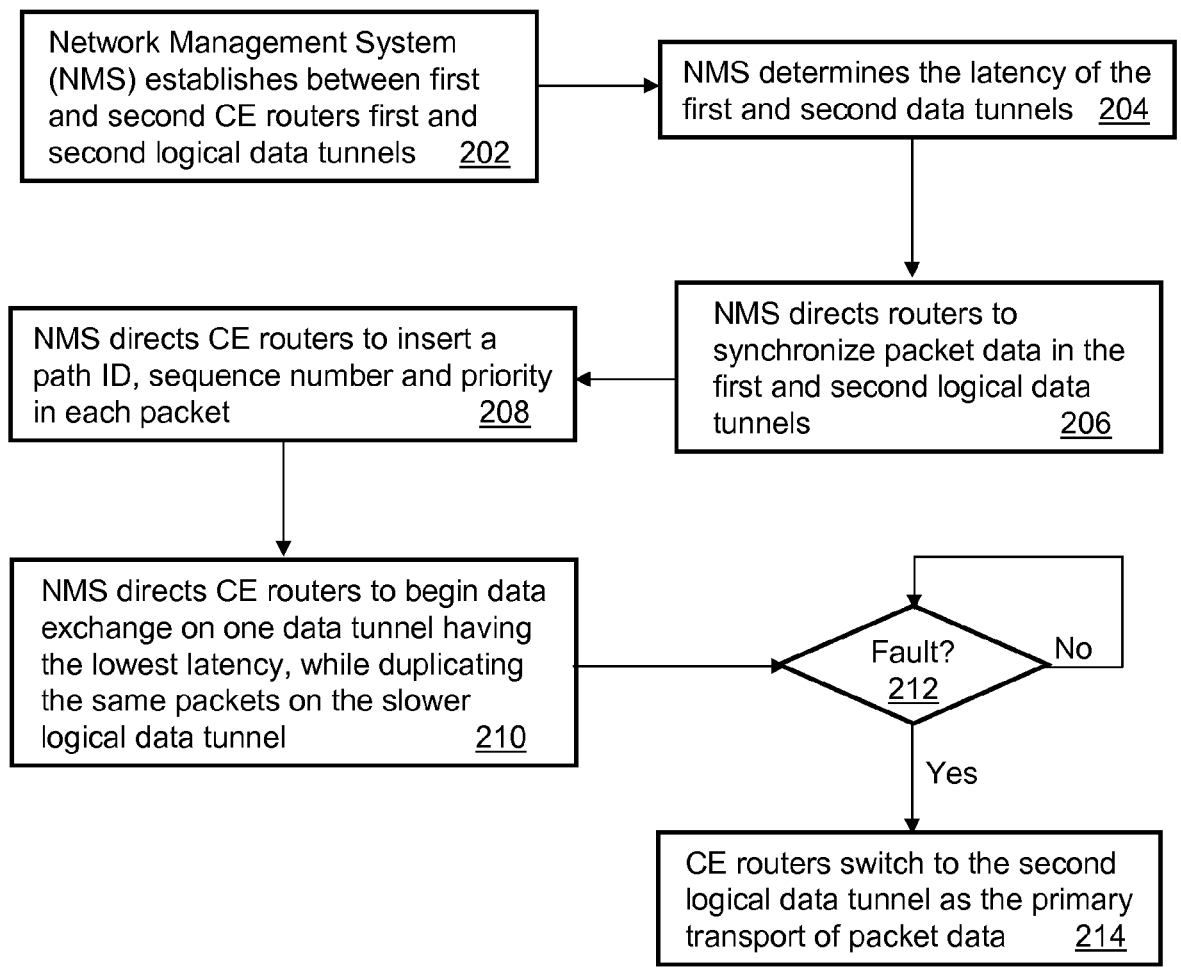
FIG. 2 depicts an exemplary method operating in a number of network elements of the communication system.

FIG. 2 depicts an exemplary method 200 operating in the routing elements 104, 109 of the communication system 100. Method 200 begins with step 202 in which the NMS 110 establishes between the CE router 109 in Dallas and the CE router 109 in New York first and second GRE tunnels 107, 108 spanning Dallas, Kansas City, Chicago and New York in the first leg, and Dallas Atlanta, and New York in the second leg. The GRE tunnels 107, 108 utilize an isolation protocol which provides the CPEs 105 a secure and private means for bidirectional communications.

In step 204, the NMS 110 determines the latency of the first and second GRE tunnels 107, 108. This can be accomplished by a number of common techniques. For instance, the CE router 109 in Dallas can transmit a number of test packets in the first GRE tunnel 107 with a starting timestamp which is then measured by the receiving CE router 109 in New York. The receiving CE router 109 can then measure the difference in time between transmission and delay of each packet and determine therefrom an average delay for the first GRE tunnel 107 which is then communicated to the NMS 110. A similar measurement can take place in the second GRE tunnel 108, and in opposite directions (i.e., New York to Dallas).

From these averages, the NMS 110 can direct in step 206 one or more routers 104 in a select one of the GRE tunnels to equalize the delay utilizing common techniques. For example, the NMS 110 can direct one or more routers 104 in the fastest GRE tunnel to buffer packet data in order to equalize the latency between the first and second GRE tunnels 107, 108. Alternatively, the CE routers 109 can be programmed to record the latency difference between the first and second GRE tunnels and utilize this information for offsetting purposes as will be described shortly in step 214.

Once a synchronization strategy has been determined for the GRE tunnels 107, 108, the NMS 110 can be programmed in step 208 to direct the CE routers 109 to insert a path identification (ID), a sequence number and a packet priority. The path ID can represent a path identifying the routing path used between the CEs (e.g., Dallas, Kansas City, Chicago would have one path ID, while Dallas and Atlanta has another path ID). Alternatively, or in combination, the path ID can represent a VPN (Virtual Private Network) ID. The sequence numbers can be utilized for tracking the order of packets in each of the GRE tunnels 107, 108. The packet priority can represent a quality metric such as QoS (Quality of Service) metric directing the routers 104 on how to prioritize the packets in the GRE tunnels 107, 108 versus packets in transit from other customers.

In step 210, the NMS can direct the CE routers 109 to begin packet data exchanges on the GRE tunnel having the lowest latency. Assume for illustration purposes only that the first GRE tunnel 107 has the lowest average CE-to-CE router latency of the two tunnels. During packet transmission on the first GRE tunnel 107, the CE routers 109 can be directed to duplicate the same packets on the second GRE tunnel 108. The duplicate packets have the same content as those transmitted on the first GRE tunnel 107 with the exception of the path IDs. In step 212, the CE routers 109 can be further directed to check for a fault in data transmissions therebetween on the first GRE tunnel 107.

A packet transmission fault can occur for any number of reasons. For example, a field engineer inadvertently cuts a fiber cable associated with the routers 104 carrying packet data in the first GRE tunnel 107. A router 104 in said first data tunnel 107 experiences a fault such as a power loss or hardware or software defect. There are countless other fault scenarios that for practical reasons will not be covered in the present disclosure. With this in mind, the CE routers 109 can be programmed with a number of common fault detection techniques to respond to a fault. Such techniques can include packet loss detection, signaling interactions with the MPLS network 102 for monitoring the health of routers 104 in the network, and so on. When a CE router 109 detects in step 212 a fault in the first GRE tunnel 107, the CE router 109 switches to the second GRE tunnel 108 as the primary source for packet data transport.

The switch can be performed synchronously so that it incurs minimal or no packet losses, thereby preventing a traffic interruption with the CPEs 105. By selecting the faster of the two GRE tunnels as the first GRE tunnel 107, the CE router 109 detecting the fault can switch to the second GRE tunnel 108 with time to synchronize to the incoming packet data traffic with minimal or no losses at all. The synchronization can take place by analyzing the sequence number associated with each packet. The CE router 109 can be programmed to begin processing the packet data stream once it finds the packet sequence number after the last packet which was processed in the first GRE tunnel 107 before the fault. To avoid excessive delay when switching between the GRE tunnels which might cause an interruption in the end-to-end packet transport between the CPEs 105, the synchronization step 206 can equalize the delay between the GRE tunnels utilizing common buffering techniques to a desired latency that is sufficient for synchronized switching, and below a desired latency for said switching process.

For instance, the NMS 110 can determine from customer data requirements that a delay greater than 100 ms may lead to a traffic interruption during a transition between tunnels. Accordingly, if the difference in delay between the first and second GRE tunnels exceeds this threshold, the NMS 110 can direct one or more routers 104 in step 206 in the faster tunnel to add some delay to the path so as to reduce the difference between both paths, but provide enough delay in the slower path to perform a switch with minimal or no packet losses.

It would be apparent to an artisan with ordinary skill in the art that other suitable methods for synchronizing the first and second GRE tunnels 107, 108 can be applied to the present disclosure. It would be evident to said artisan therefore that method 200 can be modified, reduced, or enhanced without departing from the scope and spirit of the claims described below. Accordingly, the reader is directed to the claims below for a fuller understanding of the breadth and scope of the present disclosure.

Figure 3:
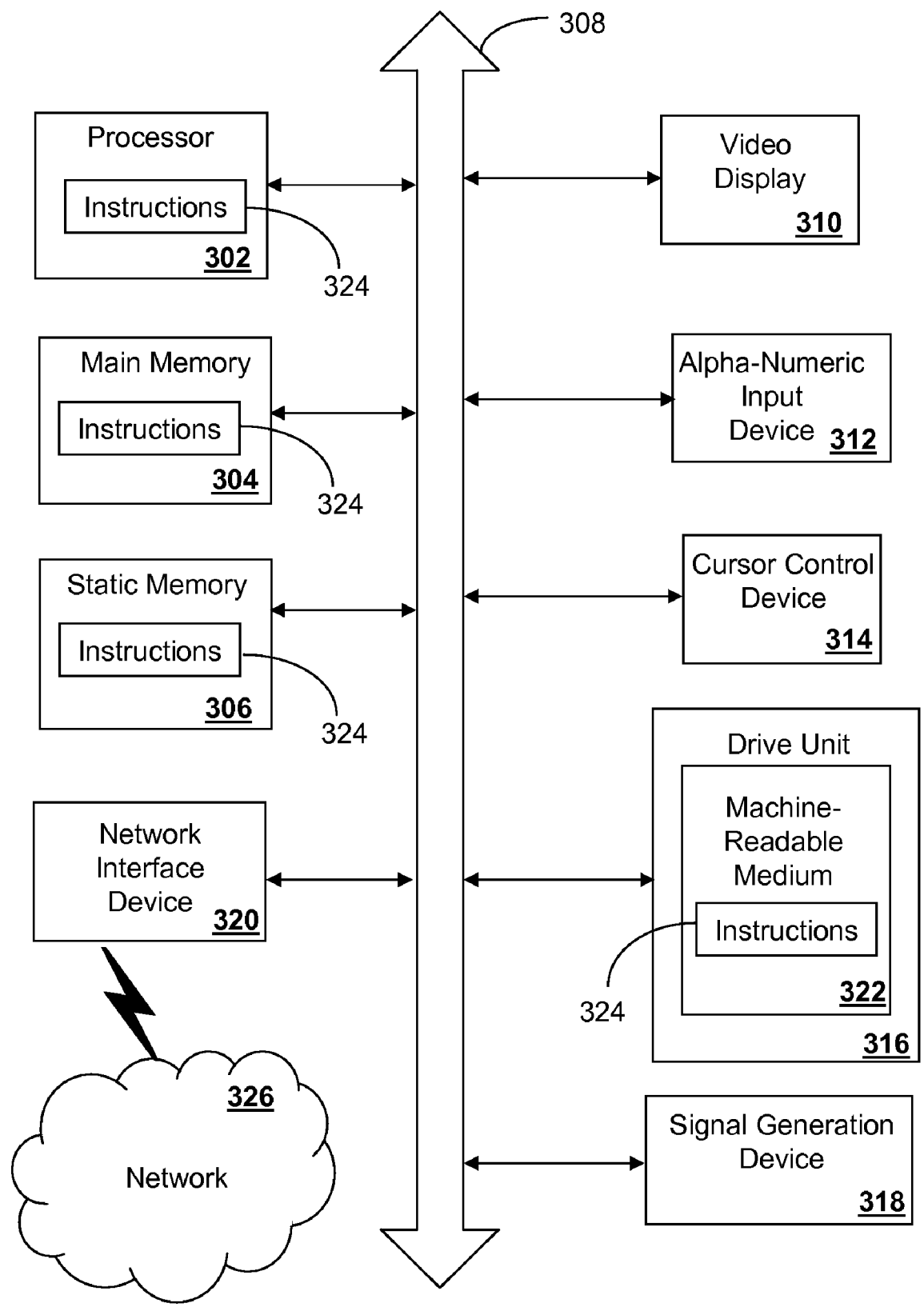
FIG. 3 is a diagrammatic representation of a machine in the form of a computer system within which a set of instructions, when executed, may cause the machine to perform any one or more of the methodologies discussed herein.

FIG. 3 is a diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated above. The instructions 324 may also reside, completely or at least partially, within the main memory 304, the static memory 306, and/or within the processor 302 during execution thereof by the computer system 300. The main memory 304 and the processor 302 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A network management system (NMS), comprising a controller that manages a communications interface, wherein the controller is programmed to:

establish between first and second customer edge (CE) routers in a full mesh packet network a first logical data tunnel conforming to an isolation protocol;

establish between the first and second CE routers a second logical data tunnel conforming to the isolation protocol;

determine which of the first and second logical data tunnels has a lower end-to-end packet transmission latency;

direct one or more routers associated with the determined one of the first and second logical data tunnels having the lowest packet transmission latency to buffer packet transmissions to synchronize packet data, transport in the first and second logical data tunnels;

enable packet data exchanges between the first and second CE routers over the first logical data tunnel as a primary transport;

direct the first and second CE routers to duplicate the packet data exchanged between them over the second logical data tunnel; and direct the first and second CE routers to synchronously switch to the second logical data tunnel as the primary transport of packet data upon detecting a fault in the first logical data tunnel.

2. The NMS of claim 1, wherein the full mesh packet network comprises a multi-protocol label switching (MPLS) network.

3. The NMS of claim 1, wherein the first and second logical data tunnels conform to at least one among a group of isolation protocols comprising a GRE (Generic Routing Encapsulation) tunnel, an MPLS tunnel, a layer 2 tunneling protocol (L2TP), an IP in IP tunnel, and an IP/VPN tunnel.

4. The NMS of claim 1, wherein the first logical data tunnel has a lower end-to-end packet transmission latency than the second logical data tunnel.

5. The NMS of claim 4, wherein the controller is programmed to direct the first and second CE routers to switch to the second logical data tunnel synchronously according to a difference in latency between the first and second logical data tunnels.

6. A network management system (NMS), comprising a controller that manages a communications interface, wherein the controller is programmed to:
    establish between first and second customer edge (CE) routers in a full mesh packet network a first logical data tunnel conforming to an isolation protocol;
    establish between the first and second CE routers a second logical data tunnel conforming to the isolation protocol;
    synchronize packet data in the first and second logical data tunnels;
    enable packet data exchanges between the first and second CE routers over the first logical data tunnel as a primary transport;
    direct the first and second CE routers to duplicate the packet data exchanged between them over the second logical data tunnel;
    direct the first and second CE routers to synchronously switch to the second logical data tunnel as the primary transport of packet data upon detecting a fault in the first logical data tunnel; and
    direct the first and second CE routers to insert in each packet transmitted in the first and second logical data tunnels a path identification (ID) and sequence number,
    wherein the switching to the second logical data tunnel is in accordance with the path ID and sequence numbers associated with packets received on the second logical data tunnel.

7. The NMS of claim 1, wherein the controller is programmed to direct the first and second CE routers to insert in each packet transmitted in the first and second logical data tunnels a packet priority, thereby causing one or more routers in each of the first and second logical data tunnels to prioritize packet data processing according to the packet priority.

8. A computer-readable storage medium in a network management system (NMS), comprising computer instructions to:
    establish between first and second routers of a packet network first and second logical data tunnels conforming to an isolation protocol;
    determine which of the first and second logical data tunnels has a lower end-to-end packet transmission delay;
    direct one or more routers associated with the determined one of the first and second logical data tunnels having the lowest packet transmission delay to buffer packet transmissions to equalize packet data transport delays in the first and second logical data tunnels; and
    direct the first and second routers to duplicate the packet data exchanged between them over the second logical data tunnel when said first and second routers switch from the first logical data tunnel to the second logical data tunnel as a primary transport of packet data.

9. The storage medium of claim 8, wherein the first router is coupled to a first customer premise equipment (CPE), wherein the second router is coupled to a second customer premise equipment (CPE), and wherein the first and second CPEs experience no traffic interruptions during the synchronous switch.

10. The storage medium of claim 8, wherein the packet network comprises a multi-protocol label switching (MPLS) network.

11. The storage medium of claim 8, wherein the first and second logical data tunnels conform to at least one among a group of isolation protocols comprising a GRE (Generic Routing Encapsulation) tunnel, an MPLS tunnel, a layer 2 tunneling protocol (L2TP), an P in IP tunnel, and an IP/VPN tunnel.

12. The storage medium of claim 8, wherein the first logical data tunnel has a lower end-to-end packet transmission latency than the second logical data tunnel.

13. The storage medium of claim 8, comprising computer instructions to:
    direct the first and second routers to insert in each packet transmitted in the first and second logical data tunnels a path identification (ID) and sequence number.

14. The storage medium of claim 8, comprising computer instructions to direct the first and second routers to insert in each packet transmitted in the first and second logical data tunnels a packet priority to cause one or more routers associated with the first and second logical data tunnels to prioritize packet data processing according to the packet priority.

15. A computer-readable storage medium in a first routing element comprising computer instructions to:
    initiate packet data exchanges with a second routing element over a first logical data tunnel as a primary means for exchanging information;
    establish a second logical data tunnel with the second routing element;
    synchronize packet data exchanges with the second routing element over the first and second logical data tunnels;
    duplicate the packet data exchanged with the second routing element over the second logical data tunnel;
    insert in each packet transmitted in the first and second logical data, tunnels a path identification (ID) and sequence number; and
    synchronously switch transport of packet data from the first logical data tunnel to the second logical data tunnel, upon detecting a fault in the first logical data tunnel, according to the path ID and sequence number of packets received over the second logical data tunnel.

16. The storage medium of claim 15, wherein the first and second logical data tunnels conform to at least one among a group of isolation protocols comprising a GRE (Generic Routing Encapsulation) tunnel, an MPLS tunnel, a layer 2 tunneling protocol (L2TP), an P in IP tunnel, and an IP/VPN tunnel.

17. The storage medium of claim 16, wherein the first logical data tunnel has a lower end-to-end packet transmission delay than the second logical data tunnel.

* * * * *